(12) United States Patent
Arcand

(10) Patent No.: US 6,779,291 B2
(45) Date of Patent: Aug. 24, 2004

(54) SOUND TRANSMITTING DEVICE FOR A FISHING LURE

(76) Inventor: Robert Arcand, 1801-37th Street W. Saskatoon, Saskatchewan (CA), S7I 4E2

( * ) Notice: Subject to any disclaimer, the term of this patent is extended or adjusted under 35 U.S.C. 154(b) by 0 days.

(21) Appl. No.: 10/192,313

(22) Filed: Jul. 11, 2002

(65) Prior Publication Data

US 2003/0115788 A1 Jun. 26, 2003

Related U.S. Application Data

(60) Provisional application No. 60/306,847, filed on Jul. 23, 2001.

(51) Int. Cl.[7] .............................................. A01K 87/00
(52) U.S. Cl. ............................ 43/4.5; 43/19.2; 43/17.1; 43/25
(58) Field of Search ..................... 43/4.5, 17.1, 19.2, 43/25

(56) References Cited

U.S. PATENT DOCUMENTS

| | | | | | |
|---|---|---|---|---|---|
| 2,624,145 | A | * | 1/1953 | Wehn | .......................... 43/17.1 |
| 2,861,378 | A | * | 11/1958 | Bell | ............................ 43/19.2 |
| 2,908,103 | A | * | 10/1959 | Mertz | .......................... 43/19.2 |
| 3,789,534 | A | | 2/1974 | Yankaitis | |
| 4,420,900 | A | | 12/1983 | Nestor | |
| 4,700,501 | A | * | 10/1987 | Bryan | ........................ 43/19.2 |
| 4,821,448 | A | | 4/1989 | Lindaberry | |

FOREIGN PATENT DOCUMENTS

| | | | | | |
|---|---|---|---|---|---|
| SU | 234790 | * | 9/1969 | ................. | 43/19.2 |
| SU | 0665878 | * | 6/1979 | ................. | 43/19.2 |
| SU | 001717044 | * | 3/1992 | ................. | 43/19.2 |

* cited by examiner

*Primary Examiner*—Kurt Rowan
(74) *Attorney, Agent, or Firm*—Ryan W. Dupuis; Adrian D. Battison; Michael R. Williams

(57) ABSTRACT

A device is provided for transmitting a sound signal to a fishing lure on a fishing line of a fishing rod. The device includes a vibrating element supported on the fishing rod to transmit vibrations to the fishing rod and means for coupling the vibrating element to a sound signal source to vibrate the vibrating element in response to the sound signal. The vibrating element is movable relative to the fishing rod at a frequency dependent upon a frequency of the sound signal and at an amplitude dependent upon an amplitude of the sound signal. The vibrating element allows sound to be transmitted to a fishing lure without the need of a complex and specially adapted lure. The sound can be transmitted to a conventional fishing lure through the fishing line in the form of vibrations within a range of frequencies audible to the fish. Furthermore, the vibrations can be completely random so as to simulate movements of live bait.

11 Claims, 2 Drawing Sheets

SOUND TRANSMITTING DEVICE FOR A FISHING LURE

This application is a provisional which claims benefit of 60/306,847 filed on Jul. 23, 2001.

FIELD OF THE INVENTION

The present invention relates to a device for transmitting sound to a fishing lure and more particularly to a sound transmitting device for transmitting a sound signal from a source to a fishing lure through a fishing rod and fishing line supporting the lure.

BACKGROUND

When fishing it is known that fish are attracted to certain types of sound. Known devices for transmission of sound from a fishing lure however require a complex lure having sound producing components therein.

It is also desirable to provide some motion to the lure of a fishing line to attract fish. Examples of jigging devices are found in U.S. Pat. Nos. 4,821,448 to Lindaberry, 4,700,501 to Bryan, 4,420,900 to Nestor and 3,789,534 to Yankaitis. These jigging devices typically provide a mechanical mechanism having an eccentrically rotating element to provide some limited motion to the lure. The motion produced however repeats at regular intervals and cannot be randomised as would be desired to simulate live bait. Furthermore, these devices are limited in that they are unable to transmit sound vibrations within an audible range of frequencies.

SUMMARY

According to one aspect of the present invention there is provided a device for transmitting a sound signal to a fishing lure on a fishing line of a fishing rod, the device comprising:
  a vibrating element arranged to be supported on the fishing rod for movement relative to the fishing rod;
  a coupling mechanism arranged to couple the vibrating element to the fishing rod to transmit vibrations of the vibrating element to the fishing rod; and
  a pair of electrical leads coupled to the vibrating element arranged to receive a sound signal and to vibrate the vibrating element in response to receipt of the sound signal;
  the vibrating element being arranged for movement relative to the fishing rod at a frequency dependent upon a frequency of the sound signal and at an amplitude dependent upon an amplitude of the sound signal.

The use of a vibrating element which is responsive to frequency and amplitude of a sound signal allows sound to be transmitted to a fishing lure without the need of a complex and specially adapted lure. The sound can be transmitted to a conventional fishing lure through the fishing line in the form of vibrations within a range of frequencies audible to the fish. Furthermore, the vibrations can be completely random so as to simulate live bait.

The vibrating element may be movable through a range of frequencies within the audible frequency range. This would typically include a frequency range of 20 hertz to 20 kilohertz, but the vibrating element may be arranged to vibrate at lower frequencies from 1 through 20 hertz or higher frequencies outside of the typical audible range as well. Low frequencies are particularly useful in attracting fish as fish include sensors along the sides of their bodies in the form of lateral lines which are capable of sensing lower frequencies.

The vibrating element may also be arranged to vibrate within the sonar range of 10 kilohertz to 50 kilohertz. This will also include some of the ultrasonic range which typically includes frequencies of over 20 kilohertz.

The vibrating element may be arranged to vibrate at a variable frequency dependent upon a frequency of the sound signal and at a variable amplitude dependent upon an amplitude of the sound signal.

There may he provided a weighted member selectively mounted on the vibrating element for movement with the vibrating element relative to the fishing rod. Varying the size of the weighted member mounted on the vibrating element affects the amplitude of vibrations transmitted to the fishing rod.

The vibrating element may be arranged to be coupled directly to the fishing line for transmitting vibrations directly to the fishing line.

When coupled to the fishing line, the vibrating element is preferably arranged to displace the fishing line in a longitudinal direction of the fishing rod at a frequency which corresponds to frequency of the sound signal.

There may also be provided a weighted member selectively mounted on the vibrating element for movement with the vibrating element relative to the housing when the vibrating element is coupled to the fishing line.

The vibrating element is preferably arranged to displace the fishing line in a radial direction of the fishing rod at a location spaced between a pair of adjacent line guides so as to displace the fishing line in a longitudinal direction of the fishing line adjacent a free end of the fishing rod.

The vibrating element may include a neutral position, a first deflected position and a second deflected position. In the first deflected position, the fishing line is deflected in a first direction corresponding to current being passed through the electrical leads in a first direction. In the second deflected position, the fishing line is preferably deflected in a second direction opposite the first direction corresponding to current being passed through the electrical leads in a second direction opposite the first direction.

The vibrating element may comprise an electromagnetic coil supported in proximity to a permanent magnet.

According to a further aspect of the present invention there is provided a method of transmitting a sound signal to a fishing lure supported on a fishing line of a fishing rod, the method comprising:
  providing a vibrating element;
  coupling the vibrating element to the fishing rod;
  providing a source for generating a sound signal; and
  coupling the source to the vibrating element and thereby displacing the vibrating element relative to the fishing rod at a frequency dependent upon a frequency of the sound signal and at an amplitude dependent upon an amplitude of the sound signal.

The method may include vibrating the vibrating element at a variable frequency dependent upon a frequency of the sound signal or at a variable amplitude dependent upon an amplitude of the sound signal.

Adjusting amplitude of the vibrating element may include adjusting weight of the vibrating element.

In a preferred arrangement, the fishing line may be directly vibrated by coupling the vibrating element to the fishing line.

The fishing line may be vibrated by displacing the fishing line in a longitudinal direction of the fishing rod at a frequency which corresponds to frequency of the sound signal.

Alternatively, the fishing line may be vibrated by displacing the fishing line in a radial direction of the fishing rod at a location spaced between a pair of adjacent line guides so as to displace the fishing line in a longitudinal direction of the fishing line adjacent a free end of the fishing rod.

BRIEF DESCRIPTION OF THE DRAWINGS

In the accompanying drawings, which illustrate exemplary embodiments of the present invention.

DETAILED DESCRIPTION

Figure 1:
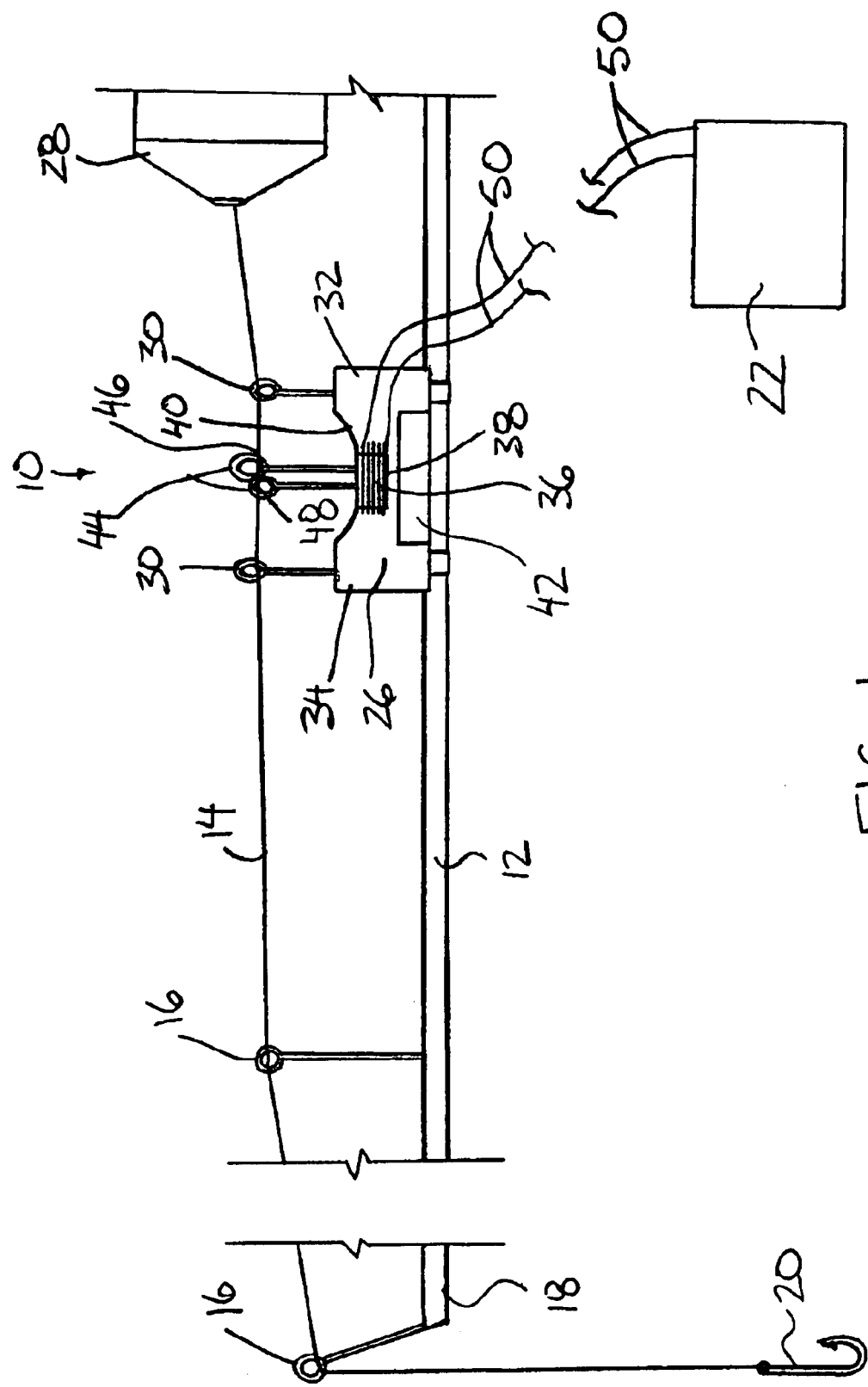
FIG. 1 is a side elevational view of the device shown mounted on a fishing rod.
Figure 2:
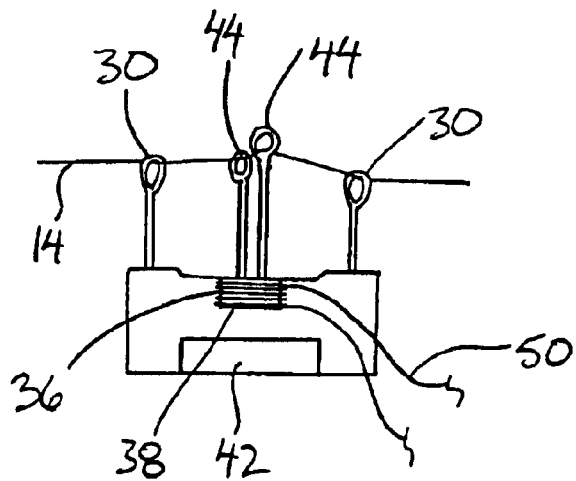
FIG. 2 is a side elevational view of the device of FIG. 1 shown in a first deflected position.

Referring to the accompanying drawings, there is illustrated a sound transmitting device generally indicated by reference numeral 10. The device is intended for use for attracting fish when fishing.

The device 10 is mounted on a conventional fishing rod including an elongate rod 12 supporting a fishing line 14 thereon to extend along side the rod in the longitudinal direction of the rod. The fishing line 14 is supported along the rod by a plurality of line guides 16, each comprising a metallic loop receiving the fishing line therethrough as in conventional line guides. The fishing line 14 is arranged to be suspended from a free end 18 of the fishing rod for suspending a fishing lure 20 therefrom. The device 10 is arranged to be coupled to the fishing rod for transmitting a sound signal having varying amplitude and frequency from a sound source 22 to the fishing lure 20.

The device generally includes a housing 26 arranged to be selectively mounted along the rod 12. The housing 26 may be mounted spaced between any adjacent pair of the line guides 16 or between one of the line guides and the reel 28 of the fishing rod opposite the free end 18 of the rod.

The housing includes two fixed line guides 30 mounted thereon at an inner end 32 and adjacent an outer end 34 of the housing respectively. The fixed line guides 30 are vertically offset from one another such that the guide adjacent the inner end 32 is lower than the guide adjacent the outer end 34 to receive the line under tension therethrough, undeflected between the fixed line guides. The radial spacing of the line guides 30 from the rod is arranged to be intermediate the line guide of the reel 28 and the first line guide 16 so that the fishing line extends under tension from the top end of the inner line guide 30 to the bottom end of the outer line guide.

The device 10 includes a vibrating element in the form of an electromagnetic coil 36 which is suspended on the housing 26 for movement relative to the housing and the fishing rod in a radial direction of the rod. The coil 36 is wrapped around a core of magnetic material 38 which is suspended on a flexible support 40 of the housing. The core of magnetic material 38 about which the electromagnetic coil 36 is wound is arranged to be suspended above a permanent magnet 42 which is fixed on the housing and has a fixed magnetic orientation. By alternating the current in the electromagnetic coil 36, the vibrating element including the coil 36, the core 38 and the flexible support 40 is urged either towards or away from the permanent magnet 42 and the rod upon which it is fixed by varying the magnetic field surrounding the core of magnetic material.

The vibrating element further includes two movable line guides 44 mounted on the flexible support 40 for movement with the vibrating element in response to a current being passed through the electromagnetic coil 36. The movable line guides 44 are offset from one another such that in the neutral position, as illustrated in FIG. 1, the movable line guide 44 nearest the inner end 32 is spaced above the fixed line guide 30 adjacent the inner end 32.

Accordingly, the movable line guide 44 nearest the outer end 34 is spaced below the fixed line guide 30 nearest the outer end. The offset between the movable line guides 44 is arranged such that the bottom end 46 of the guide 44 nearest the inner end is substantially aligned with the top end 48 of the guide 44 nearest the outer end so that one of the movable line guides 44 is touching the fishing line passing therethrough at all times regardless of the position of the movable line guides 44 in the radial direction of the rod.

In the neutral position of FIG. 1 the line guides 30 and 44 of the device are arranged to permit the fishing line to pass undeflected between the fixed line guides at respective ends of the device so that tension from the line does not work against the coil 36 nor is the flexible support 40 required to be in a flexed position in the neutral position of the device. Any upward or downward movement of the vibrating element in the radial direction of the rod from the neutral position will result in deflection of the fishing line. By deflecting the fishing line radially between two adjacent line guides 16 of the fishing rod the fishing line is effectively displaced longitudinally along the rod in the longitudinal direction of the fishing line at a frequency and amplitude designated by a current passing through the electromagnetic coil 36.

Figure 3:
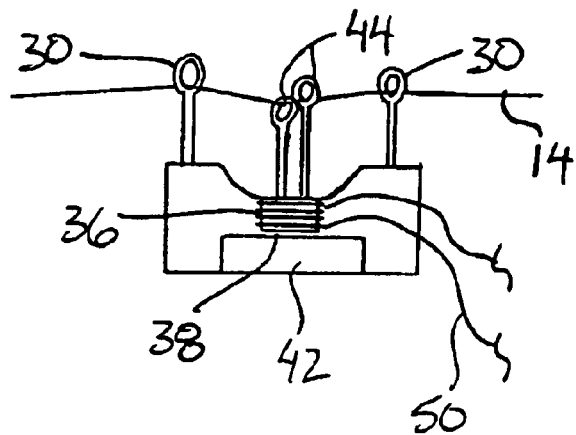
FIG. 3 is a side elevational view of the device of FIG. 1 shown in a second deflected position.

The ends of the electromagnetic coil 36 form a pair of electrical leads 50 which connect the device 10 to the sound source 22. When a current is passed through the electrical leads 50 and the coil 36 in a first direction the vibrating element and the movable line guides 44 supporting the fishing line 14 therethrough are deflected upwards in a first deflected position. Passing the current through the coil end leads 50 in a second direction opposite to the first direction results in the vibrating element being deflected downwards in a second deflected position as illustrated in FIG. 3.

By rapidly alternating direction of the current or by alternating from a current being supplied to no current being supplied, the vibrating element is effectively vibrated between the neutral position and the first and second deflected positions as desired. The current provided to the coil 36 and the electrical leads 50 may be provided by any suitable source having an amplifier and means for generating a sound signal such as a tuner or a pre-recorded playback device. The electrical leads 50 are connected to the speaker connections of the amplifier so that the electrical leads 50 of the device 10 are arranged to receive a sound signal from the source 22 and vibrates the movable line guides 44 on the rod in response to frequency and amplitude of the sound signal.

The electromagnetic coil 36 is arranged to vibrate the vibrating element at varying frequencies and amplitudes dependent upon the varying frequency and amplitude of the sound signal. Longitudinal displacement of the fishing line 14 along side the rod 12 and adjacent the free end 18 is dependent on the sound signal in regard to frequency and amplitude. Because the frequency of deflection of the vibrating element depends on the frequency of the sound signal and the amplitude similarly depends on the amplitude of the sound signal, sound is effectively transmitted in the form of vibrations in the longitudinal direction of the fishing line to the fishing lure.

The fishing line is movable with the vibrating element within an audible frequency range, for example between 20 Hz and 200 kHz. Arranging the vibrating element to be responsive to frequencies as low as 1 Hz provides sound signals which can be sensed by low frequency sensors in the form of lateral lines of the fish which are desired to be attracted. In further embodiments, the vibrating element may be arranged to vibrate within the sonar range of 10 to 50 kilohertz. Arranging the vibrating element to vibrate at frequencies in the ultrasonic range can also be desirable in some embodiments depending upon the type of fish being sought. The ultrasonic range in this instance is intended to designate frequencies which are at least 20 kilohertz.

In a further arrangement weights can be selectively mounted to the vibrating element to dampen vibration at higher frequencies if desired. The weights are selectively mounted on the vibrating element so as to permit as much or as little weight to be supported thereon as desired.

Figure 4:
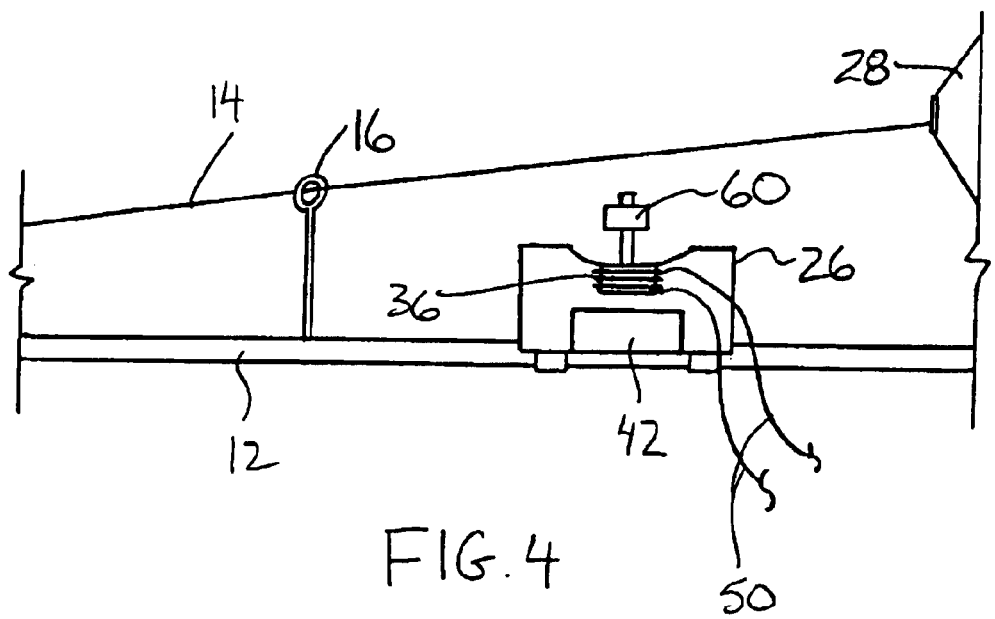
FIG. 4 is a side elevational view of an alternate embodiment of the device shown mounted on a fishing rod.

A further embodiment of the sound transmitting device is illustrated in FIG. 4. The device of FIG. 4 includes a weight 60 which is selectively mounted on the flexible support 40 of the vibrating element for movement with the vibrating element similarly to the line guides 44 described above. In the embodiment of FIG. 4 the device does not couple directly to the fishing line, but is secured only to the rod 12. By providing sufficient weight 60 on the vibrating element sound vibrations within the desired frequency range may still be transmitted to the rod and subsequently to the fishing line and lure supported thereon as desired. In this arrangement it may be preferable to mount the device adjacent the free end 18 of the rod to provide greater response of the rod to the frequencies generated by the device. The weight 60 in this arrangement is selectively mounted to permit replacement or adjustment as required for optimizing the transmission of vibration to the fishing line.

In further arrangements the first embodiment may be simplified while still operating somewhat effectively by providing only a single movable line guide which interacts with the existing line guides of a fishing rod. The vibrating element may also be modified by replacing the electromagnetic coil 36 with an electrostatic member similar to those used in electrostatic speakers. The use of piezo-crystals is also appropriate for generating a vibration upon receipt of an electrical sound signal having varying and amplitude.

While various embodiments of the present invention have been described in the foregoing, it is to be understood that other embodiments are possible within the scope of the invention. The invention is to be considered limited solely by the scope of the appended claims.

What is claimed is:

1. A sound transmitting device in combination with a playback device which includes an amplifier having speaker connections and which generates a pre-recorded sound signal for transmitting the sound signal to a fishing lure on a fishing line of a fishing rod, the sound transmitting device comprising:

a vibrating element arranged to be supported on the fishing rod for movement relative to the fishing rod;

a coupling mechanism arranged to couple the vibrating element to the fishing rod to transmit vibrations of the vibrating element to the fishing rod; and a pair of electrical leads coupled between the vibrating element and the speaker connections of the amplifier of the playback device such that the vibrating element is arranged to receive a the pre-recorded sound signal from the playback device and to vibrate in response to receipt of the sound signal at a frequency dependent upon a frequency of the pre-recorded sound signal and at an amplitude dependent upon an amplitude of the pre-recorded sound signal.

2. The combination according to claim 1 wherein the vibrating element is movable at a frequency within the audible frequency range.

3. The combination according to claim 1 wherein the vibrating element is movable at a frequency within a frequency range of 1 hertz to 20 kilohertz.

4. The combination according to claim 1 wherein the vibrating element is arranged to be coupled to the fishing line for transmitting vibrations directly to the fishing line.

5. The combination according to claim 1 wherein the vibrating element is movable at a frequency within a sonar range of frequencies.

6. The combination according to claim 1 wherein the vibrating element is movable at a frequency within an ultrasonic range.

7. A method of transmitting a sound signal to a fishing lure supported on a fishing line of a fishing rod, the method comprising:

providing a vibrating element;

coupling the vibrating element to the fishing rod;

providing a playback device Including an amplifier having speaker connections and which generates a pre-recorded sound signal;

coupling electrical leads between the speaker connections of the amplifier of the playback device and the vibrating element; and generating the pre-recorded sound at the playback device to thereby displace the vibrating element relative to the fishing rod at a frequency dependent upon a frequency of the pre-recorded sound signal and at an amplitude dependent upon an amplitude of the pre-recorded sound signal.

8. The method according to claim 7 including adjusting amplitude of the vibrating element by adjusting weight of the vibrating element.

9. The method according to claim 7 including directly vibrating the fishing line by coupling the vibrating element to the fishing line.

10. The method according to claim 7 including vibrating the fishing line by displacing the fishing line in a longitudinal direction of the fishing rod at a frequency which corresponds to frequency of the sound signal.

11. The method according to claim 7 including vibrating the fishing line by displacing the fishing line in a radial direction of the fishing rod at a location spaced between a pair of adjacent line guides so as to displace the fishing line in a longitudinal direction of the fishing line adjacent a free end of the fishing rod.

* * * * *